(No Model.)
R. W. MILLER.
DEVICE FOR PREVENTING HAMMER IN WATER PIPES.
No. 273,379. Patented Mar. 6, 1883.
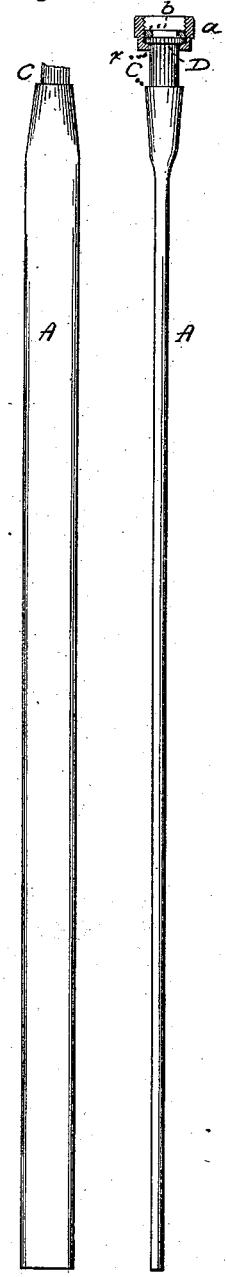
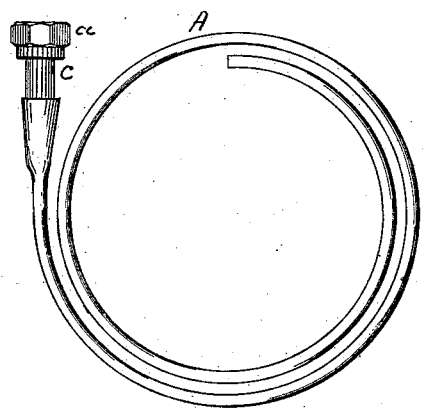
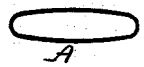
Witnesses
Daniel S. Glenney Jr
Frank L. Nichols
Inventor
Richard W. Miller
by Geo. Terry
his Atty ered nut $a$, which moves and is held by its internally-projecting part $x$ between the shoulders C and D on the pipe A. The rubber washer $b$ comes between the end of the pipe A and the end of the water-pipe to which it is attached, and forms the packing between the two. The thickness of the pipe should vary with the water-pressure to which it is to be subjected; or the longer diameter of the pipe may be increased, which will produce a like result. It may be bent into any form required to adapt it to the position in which it is to be placed. The end of the pipe remote from its attachment is closed. Constructed and attached to a water-pipe in the way described, the elliptical pipe, on any increase of water-pressure within the same, springs, has its shorter diameter increased, and tends to assume a circular form, whereby its capacity is enlarged, and the noise and, in a measure, the strain on the pipe, commonly called "water-hammer," are prevented.

UNITED STATES PATENT OFFICE.

RICHARD W. MILLER, OF NEW HAVEN, CONNECTICUT, ASSIGNOR OF ONE-THIRD TO JAMES TOTHAM, OF SAME PLACE.

DEVICE FOR PREVENTING HAMMER IN WATER-PIPES.

SPECIFICATION forming part of Letters Patent No. 273,379, dated March 6, 1883.

Application filed July 18, 1882. (No model.)

*To all whom it may concern:*

Be it known that I, RICHARD W. MILLER, a citizen of the United States of America, residing at New Haven, in the county of New Haven and State of Connecticut, have invented certain new and useful Improvements in Devices to Prevent Water-Hammer in Water-Pipes, of which the following is a specification, reference being had to the accompanying drawings, in which—

Figure 1 is a view of a coiled elliptical pipe. Fig. 2 is an edge view of a straight elliptical pipe, and of a device, in section, for attaching it to a water-pipe. Fig. 3 is a cross-section of an elliptical pipe, and Fig. 4 is a view of the side of the same.

My invention relates to a device the object of which is to prevent the strain and noise in water-pipes, caused by the sudden closing of an outlet, or "water-hammer," as the noise and strain are commonly called. Ordinarily air-chambers have been used for this purpose, which require to be refilled frequently, as the air is constantly leaking out.

The improvement consists in attaching to the water-pipe an elliptical pipe which is adapted by its form and thickness to spring and have its capacity enlarged by any sudden increase of the pressure of the water within the pipe.

To enable others to make my improved device, so that it will operate in the way contemplated, I will give a detailed description of the same.

A in the several figures represents an elliptical pipe, the view in Fig. 4 being a cross-section of the pipe. One of its ends is furnished with the ordinary means of attachment to a water-pipe, consisting of the internally-thread- Having explained my improved device and its operation, what I claim as new, and desire to secure by Letters Patent, is—

The elliptical pipe A, provided with means for its attachment to a water-pipe, and adapted by its form and thickness to spring and have its capacity enlarged by any sudden increase of water-pressure within the same, substantially as and for the purpose specified.

In testimony whereof I affix my signature in presence of two witnesses.

RICHARD W. MILLER.

Witnesses:
GEORGE TERRY,
F. L. NICHOLS.